(12) United States Patent
Panse

(10) Patent No.: US 8,981,918 B2
(45) Date of Patent: Mar. 17, 2015

(54) GAWR EXCEED WARNING SYSTEM FOR A VEHICLE

(75) Inventor: Satish Panse, Clawson, MI (US)

(73) Assignee: Chrysler Group LLC, Auburn Hills, MI (US)

(*) Notice: Subject to any disclaimer, the term of this patent is extended or adjusted under 35 U.S.C. 154(b) by 398 days.

(21) Appl. No.: 13/224,832

(22) Filed: Sep. 2, 2011

(65) Prior Publication Data

US 2013/0057399 A1 Mar. 7, 2013

(51) Int. Cl.
*B60G 17/052* (2006.01)
*G01G 19/08* (2006.01)
(Continued)

(52) U.S. Cl.
CPC ............ *G01G 19/08* (2013.01); *B60G 17/0525* (2013.01); *B60G 17/01908* (2013.01); *B60G 17/017* (2013.01); *B60G 17/0565* (2013.01); *B60G 2800/20* (2013.01); *B60G 2800/01* (2013.01); *B60G 2800/914* (2013.01); *B60Q 1/2661* (2013.01); *B60Q 1/2619* (2013.01); *B60Q 9/001* (2013.01); *B60G 2400/252* (2013.01); *B60G 2400/051* (2013.01); *B60Q 1/346* (2013.01); *B60G 2800/019* (2013.01); *B60G 2800/915* (2013.01); *B60G 2400/51222* (2013.01); *B60G 2400/60* (2013.01); *B60G 2400/61* (2013.01); *B60G 2500/30* (2013.01)
USPC ........... 340/440; 340/443; 340/463; 340/468; 340/472; 340/474; 340/479; 280/5.514; 280/6.151; 280/6.152; 280/6.153; 280/6.157; 280/6.159; 701/37

(58) Field of Classification Search
CPC ........... B60G 17/0525; B60G 2400/60; B60G 2400/61; B60G 2400/252; B60G 2800/019; B60G 2800/20; B60G 2800/914; B60G 2800/915; B60G 17/017; B60G 17/01908; B60Q 9/001; B60Q 1/2619; B60Q 1/2661; B60Q 1/346
USPC .......................... 340/440, 443, 474, 463, 468; 280/5.514, 6.15, 6.151, 6.152, 6.153; 701/37

See application file for complete search history.

(56) References Cited

U.S. PATENT DOCUMENTS 3,693,145 A 9/1972 Mize
4,078,224 A 3/1978 Mize
(Continued)

FOREIGN PATENT DOCUMENTS

WO 9905484 2/1999
OTHER PUBLICATIONS

International Search Report dated Jan. 31, 2013 for International Application No. PCT/US2012/052978, International Filing Date Aug. 30, 2012.
(Continued)

*Primary Examiner* — Daniell L Negron
*Assistant Examiner* — Benyam Haile
(74) *Attorney, Agent, or Firm* — Ralph E Smith

(57) ABSTRACT

A warning system for a vehicle having an air suspension system can include an indicator, an event data recorder, and a controller. The controller can be configured to determine a load on a front axle and a rear axle when the vehicle is in a static condition and compare the determined load on the front and rear axles to a predetermined load threshold for each of the front and rear axles. A warning signal can be provided to the indicator indicative of at least one of the determined loads exceeding the corresponding predetermined load threshold upon the controller determining one of the determined loads exceeds the corresponding predetermined load threshold. Data indicative of at least one of the determined loads exceeding the corresponding predetermined threshold can be communicated to the event data recorder.

20 Claims, 2 Drawing Sheets

(51) Int. Cl.
   *B60G 17/019* (2006.01)
   *B60G 17/017* (2006.01)
   *B60G 17/056* (2006.01)
   *B60Q 1/26* (2006.01)
   *B60Q 9/00* (2006.01)
   *B60Q 1/34* (2006.01)

(56) References Cited

U.S. PATENT DOCUMENTS

| | | | |
|---|---|---|---|
| 5,090,727 A * | 2/1992 | Kii et al. | 280/5.508 |
| 5,410,109 A * | 4/1995 | Tarter et al. | 177/136 |
| 5,455,558 A * | 10/1995 | Gregory | 340/474 |
| 5,912,439 A * | 6/1999 | Eran et al. | 177/136 |
| 7,039,519 B2 | 5/2006 | Ishiguro et al. | |
| 7,113,081 B1 * | 9/2006 | Reichow et al. | 340/440 |
| 7,690,663 B2 | 4/2010 | Haire | |
| 7,722,017 B2 | 5/2010 | Holbrook et al. | |
| 7,740,257 B2 | 6/2010 | Haire | |
| 2003/0201885 A1 * | 10/2003 | Currie | 340/468 |
| 2006/0138733 A1 * | 6/2006 | Clauson | 280/5.508 |

OTHER PUBLICATIONS

Written Opinion dated Jan. 31, 2013 for International Application No. PCT/US2013/052978, International Filing Date Aug. 30, 2012.

* cited by examiner

GAWR EXCEED WARNING SYSTEM FOR A VEHICLE

FIELD

The present disclosure relates generally to a gross axle weight rating warning system for vehicles, and more particularly to a gross axle weight rating warning system for motor vehicles with an air suspension system.

BACKGROUND

Vehicles having air suspension systems that are height adjustable are known and commonly used, especially in heavy-duty vehicles. Generally, such systems include a plurality of air springs compressibly supported between the sprung and unsprung mass of the vehicle. For example, each wheel can be supported by an air spring and damper arrangement. These air suspension systems can be used to adjust the height of the vehicle on a wheel-by-wheel basis, in connection with calculating and/or estimating the load of the sprung mass of the vehicle at each suspension strut, as is know in the art.

One disadvantage of such air suspension systems is that when a vehicle, such as a pick-up truck, is loaded with heavy cargo, the air suspension systems can maintain the ride height of the vehicle to the same height as before the cargo was loaded. In such a scenario, a vehicle operator may not appreciate that the loaded cargo is too heavy for the vehicle's rated capability because the air suspension maintains the pre-loaded ride height of the vehicle even with the loaded cargo.

Thus, while known air suspension systems work for their intended purpose, there remains a need for continuous improvement in the relevant art.

SUMMARY

In one form, a warning system for a vehicle having a front axle, a rear axle and an air suspension system is provided in accordance with the present teachings. The warning system can include an indicator, an event data recorder, and a controller operatively associated with the air suspension system, the event data recorder and the indicator. The controller can be configured to determine a load on the front axle and the rear axle when the vehicle is in a static condition and compare the determined load on the front and rear axles to a predetermined load threshold for each of the front and rear axles. A warning signal can be provided to the indicator indicative of at least one of the determined loads exceeding the corresponding predetermined load threshold upon the controller determining one of the determined loads exceeds the corresponding predetermined load threshold. Data indicating of at least one of the determined loads exceeding the corresponding predetermined threshold can be communicated to the event data recorder.

In another form, a warning system for a vehicle including a front axle, a rear axle and an air suspension system is provided in accordance with the present teachings. The warning system can include an indicator, an electronic stability control system including a longitudinal accelerometer, an event data recorder configured to record certain vehicle conditions and data associated therewith, and a controller operatively associated with the indicator, air suspension system, electronic stability control system and event data recorder. The controller can be configured to determine a load on the front axle and the rear axle when the vehicle is in a static condition based on data from the air suspension system. The determined load on the front and rear axles can be compared to a predetermined load threshold for each of the front and rear axles, including accounting for an increased resultant force on one of the axles as a result of the vehicle being on a grade. A warning signal can be provided to the indicator indicative of at least one of the determined loads exceeding the corresponding predetermined load threshold upon the controller determining at least one of the determined loads exceeds the corresponding predetermined load threshold. Data indicative of at least one of the determined loads exceeding the corresponding predetermined threshold can be communicated to the event data recorder for a duration that the at least one of the determined loads exceeds the corresponding predetermined threshold.

Further areas of applicability of the teachings of the present disclosure will become apparent from the detailed description, claims and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DRAWINGS

DETAILED DESCRIPTION

Figure 1:
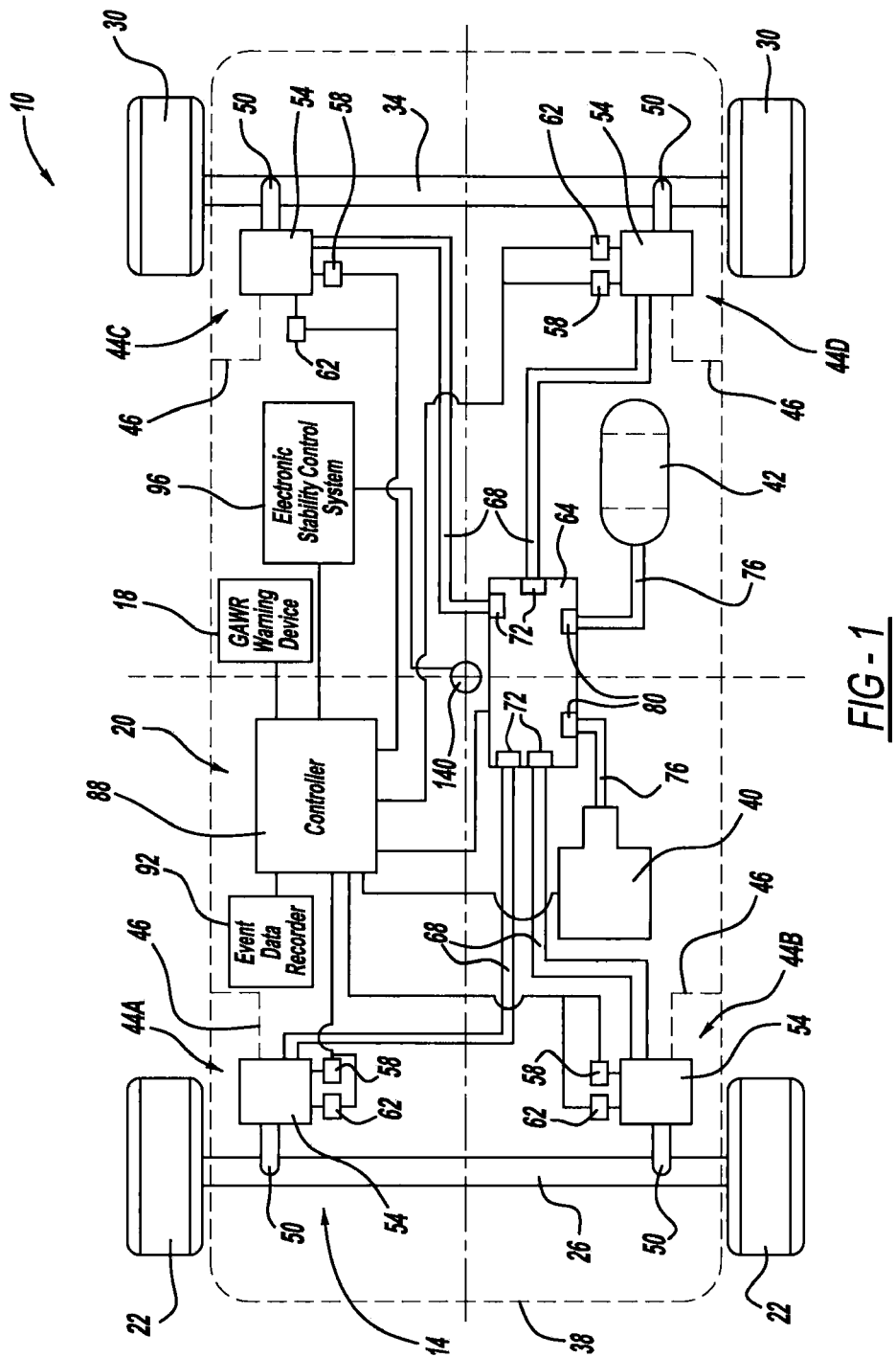
FIG. 1 is a schematic view of a vehicle with an exemplary gross axle weight rating (GAWR) warning system operatively associated with an exemplary air suspension system in accordance with the teachings of the present disclosure.
Figure 2:
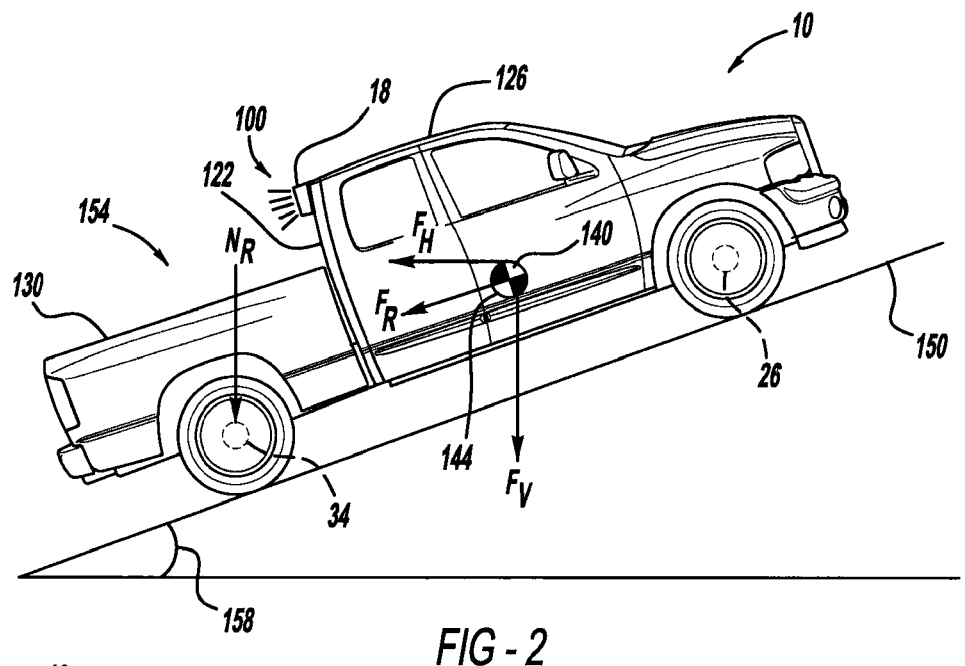
FIG. 2 is a view depicting exemplary forces associated with the vehicle of FIG. 1 being on a grade in accordance with the teachings of the present disclosure.
Figure 3:
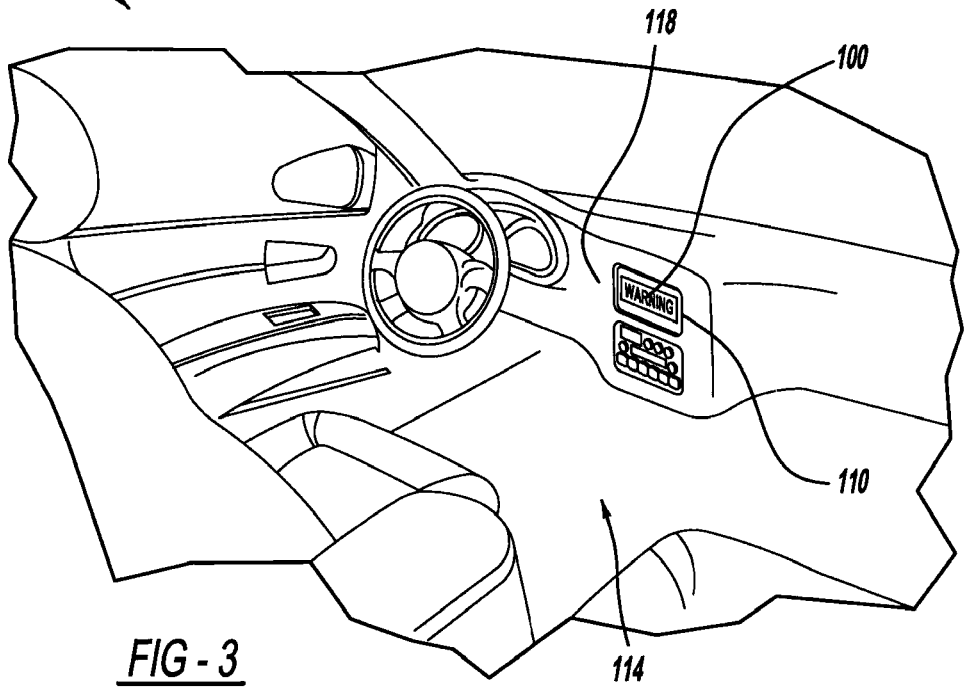
FIG. 3 is a perspective view of an exemplary GAWR warning display operatively associated with an interior of the vehicle of FIG. 1 in accordance with the teachings of the present disclosure.

With reference to FIGS. 1-3, an exemplary vehicle 10 having an air suspension system 14, a gross axle weight rating (GAWR) warning device 18, and an associated control arrangement 20 is schematically shown in accordance with an aspect of the present teachings. As will be discussed in greater detail herein, control arrangement 20 is operable in cooperation with air suspension system 14 to determine if a force on an axle of vehicle 10 is greater than the GAWR for that axle and cause the GAWR warning device 18 to provide a warning indicative of a GAWR exceed condition. In addition, while vehicle 10 is shown in FIG. 3 as being a pick-up truck, it will be appreciated that vehicle 10 can include various vehicles having the air suspension system 14 and GAWR warning device 18. For example, various vehicles in addition to pick-up trucks can be loaded beyond the rated capability of the rear axle, such as, for example, by attaching a trailer to such a vehicle with a tongue weight that imparts a force on the rear axle beyond the GAWR for that axle.

With particular reference to FIG. 1, vehicle 10 includes a pair of front wheels 22 coupled to a front axle 26, a pair of rear wheels 30 coupled to a rear axle 34, and a body or sprung mass 38. Air suspension system 14 includes a compressor 40, a supply tank 42 and four suspension struts 44A-44D. Suspension struts 44A and 44B are associated with the respective front wheels 22 and the front axle 26. Similarly, suspension struts 44C and 44D are associated with the respective rear wheels 30 and rear axle 34. Each suspension strut can be coupled to the vehicle body 38 via connection 46, as schematically shown in FIG. 1. Each suspension strut 44A-44D includes a damper 50, a height adjustable air spring 54, and a ride height sensor 58 and pressure sensor 62 each operatively associated with each air spring 54. It will be appreciated that such air suspension struts are well known and commonly used in the art and will thus not be described in further detail herein.

Each air spring 54 can be coupled to a manifold arrangement 64 via air delivery lines 68. Manifold arrangement 64 can include individual valves 72 associated in fluid communication with respective air delivery lines 68 to selectively control fluid communication between the manifold arrangement 64 and each respective air spring 54, as will be discussed in greater detail below. The compressor 40 and a supply tank 42 are each in fluid communication with manifold arrangement 64 via respective supply lines 76 and valves 80, as shown in FIG. 1.

Control arrangement 20 includes a controller 88 operatively associated with each ride height sensor 58, pressure sensor 62, manifold arrangement 64, compressor 40 and GAWR warning device 18, as shown in FIG. 1. Controller 88 can be a separate controller dedicated to the air suspension system 14 and associated components/systems, or part of a shared vehicle controller, such as a body or chassis controller. Vehicle 10 can optionally include an event data recorder 92 and an optional electronic stability control system 96, each operatively associated with controller 88.

Controller 88 can selectively control valves 72 associated with each delivery line 68 to selectively control communication between the delivery lines 68 and the manifold arrangement 64, as is known in the art. Similarly, controller 88 selectively controls compressor 40 and valves 80 associated with compressor 40 and supply tank 42 to control air pressure in manifold arrangement 64 and supply tank 42 in connection with operation of air suspension system 14, as is also known in the art.

As briefly discussed above, controller 88 in cooperation with air suspension system 14 operates to maintain the ride height of vehicle 10 at each corner or wheel of the vehicle based in part on an estimated weight of the body sprung mass 38 at each suspension strut 44A-44D using input data from the respective pressure sensors 62 and the ride height sensors 58, as is known in the art. Briefly, for example, the controller 88 is configured to estimate the weight or load of the body sprung mass 38 at each corner of vehicle 10 (i.e., each suspension strut 44A-44D supporting sprung mass 38) using ride height data from ride height sensor 58 and air spring pressure of a respective air spring 54 from pressure sensor 62. The load at each suspension strut can be estimated as a function of the measured air spring pressure and the cross-sectional area of air spring 54 and correlated with the ride height sensor data in connection with a look-up table or the like having associated predetermined load values.

The controller 88 in cooperation with the air suspension system 14 can then be configured to estimate the load on the front and rear axles 26 and 34 of vehicle 10. For front axle 26, controller 88 can estimate the load on the axle using an average of the load estimated for suspension struts 44A and 44B. Similarly, for rear axle 34, controller 88 can estimate the load on this axle using an average of the load estimated for suspension struts 44C and 44D.

In one exemplary configuration, controller 88 is configured to estimate the load on the front and rear axles 26, 34 in the manner discussed above in connection with determining whether the estimated load for each axle 26, 34 exceeds a predetermined load threshold for the axles. One predetermined load threshold, for example, can be the GAWR for the front and rear axles 26, 34. If controller 88 determines that the estimated load on one or both of the front and rear axles 26, 34 exceeds the GAWR, the controller 88 is configured to cause GAWR warning device 18 to provide warning 100 that is observable by a vehicle user and indicative of the GAWR being exceeded.

Controller 88 is configured to monitor pressure sensors 62 and ride height sensors 58 when vehicle 10 is in a static condition to determine if there is a change in the pressure data or the ride height data from the respective sensors. Such a change can be indicative of an additional load, such as cargo, passengers or a trailer, being placed on or in the vehicle. Controller 88 can be configured to compare the monitored valves with predetermined steady-state values of air spring pressure data and ride height sensor data for an unloaded vehicle 10 in a static condition. If the monitored values are greater than the predetermined steady state values, controller 88 is configured to estimate the load on the front and rear axles 26, 34 in the manner discussed above. If the estimated load exceeds the GAWR, controller 88 will cause warning device 18 to provide warning 100 indicative of the GAWR exceed condition.

In an exemplary configuration, once controller 88 determines the GAWR has been exceeded and causes warning 100 to be provided, controller 88 can maintain the warning 100 until the determined estimated load falls below the specified GAWR for each axle 26, 34. In this regard, if the vehicle is put in motion with the warning 100 being active, the warning will be maintained at least until the vehicle is again in a static condition and the load is re-estimated in the manner discussed above. If the re-estimated load falls below the GAWR threshold for each axle 26, 34, controller 88 will no longer cause warning device 18 to issue warning 100. This configuration presumes that the GAWR exceed condition in a static state of the vehicle will not be addressed or corrected while the vehicle is subsequently put in motion.

In an exemplary configuration where vehicle 10 includes event data recorder 92, controller 88 can be configured to provide the event data recorder 92 with data associated with the determined GAWR exceed condition resulting in warning 100. For example, controller 88 can provide the event data recorder 92 with estimated load data for axles 26 and 34, an amount the estimated load or loads exceed the GAWR for one or both of axles 26, 34, and an estimated duration of time that the estimated loads have exceeded the GAWR. Such data can be recorded and saved by the event data recorder 92 and selectively retrieved for a variety of circumstances. For example, such data can be used to evaluate a warranty claim directed to axles 26, 34 or associated components of vehicle 10 that may be affected by a GAWR exceed condition. As another example, such data captured by the event data recorder 92 can be used in a vehicle accident analysis where there may be an inquiry regarding whether the vehicle was overloaded from a cargo weight perspective.

GAWR warning device 18 can be a dedicated device for warnings associated with the GAWR exceed condition and/or an audio/visual device 110 of an interior 114 of vehicle 10. In one exemplary configuration, warning device 18 can be integrated into an instrument panel 118 similar to the audio/visual device 110, as shown in FIG. 3. Controller 88 can be configured to cause devices 18 and/or 110 to display a visual warning 100 and/or an audible warning. In one exemplary configuration, controller 88 will cause both the visual warning 100 and the audio warning to be provided.

With reference to FIGS. 1-3, vehicle 10 can optionally include multiple warning devices 18 and/or 110, each operatively associated with controller 88. In one exemplary configuration, vehicle 10 can include audio/visual device 110 in interior 114 as one warning device and a dedicated warning device 18 associated with an exterior 122 of cabin 126, as shown in FIG. 2. In this example, dedicated warning device 18 can be positioned to be visible to a vehicle user from a rear of the vehicle so as to be observable while cargo is being loaded into pick-up truck bed 130. This dedicated warning device 18 can be configured to provide both a visual warning 100, such as a flashing light, and an audible warning. In one exemplary configuration, GAWR warning device 18 can be coupled with a center high mounted stop lamp (CHMSL) of vehicle 10 and flash a stop lamp of the CHMSL as the visual warning 100.

Control arrangement 20 can also optionally be configured to cooperate with air suspension system 14 to selectively lower the steady-state ride height of vehicle 10 upon controller 88 determining that the GAWR of one or both axles 26, 34 has been exceeded. This configuration can provide an additional visual indication to a vehicle user that cargo or the like being loaded onto or into vehicle 10 has exceeded the specified or rated load carrying capabilities of the vehicle. In this regard, it should be appreciated that a conventional air suspension system is configured to maintain a specified ride height of the vehicle, including under circumstances where a load is placed on the vehicle. For example, a user of a vehicle with an air suspension system would typically expect the air suspension system to compensate for heavy cargo placed in pick-up truck bed 130 and maintain the pre-load ride height of the vehicle, while noting that there may be a temporary initial drop in ride height as the air suspension system increases pressure in air springs 54 to compensate for the loaded cargo.

As a result, controller 88 can be configured to control air suspension system 14 to maintain the steady-state ride height of vehicle 10 when cargo is placed in or on the vehicle with a load that does not cause the GAWR threshold to be exceeded. If the GAWR threshold is determined by controller 88 to be exceeded, then controller 88 can be configured to lower the ride height of vehicle 10 proportional to an amount of the load that exceeds the GAWR threshold. Such lowering of the vehicle can provide an additional visual indication to the vehicle user that the specified or rated load carrying capabilities of the vehicle have been exceeded.

As discussed above, vehicle 10 can optionally include the electronic stability control system 96 operatively coupled to an accelerometer, such as a dual-axis longitudinal accelerometer 140. The electronic stability control system 96 in cooperation with accelerometer 140 can determine horizontal $F_H$ and vertical $F_V$ forces of the sprung mass or body 38, as is known in the art. With particular reference to FIGS. 1 and 2, accelerometer 140 can be positioned at the center of gravity 144 of vehicle 10 and can be coupled to controller 88 via electronic stability control system 96. When vehicle 10 is on a flat or relatively flat surface, only the vertical force $F_V$ is measured by accelerometer, whereas when the vehicle is on a grade, both the horizontal $F_H$ and vertical $F_V$ forces are measured by accelerometer 140, as shown in FIG. 2.

For example, when vehicle 10 is parked on a grade 150, the sprung mass 38 can exert a resultant force $F_R$ in the direction of the grade, which is a function of the horizontal $F_H$ and vertical $F_V$ forces. The resultant force $F_R$ can increase the resultant load on the rear axle 34 that is on a downward side 154 of grade 150, as shown in FIG. 3. Such resultant force $F_R$ can increase as a function of the angle 158 of grade 150 and can be determined by controller 88 with data from accelerometer 140. The determined resultant force $F_R$ can increase the resultant load $N_R$ determined by controller 88 to be exerted on the downward side axle 34. For example, when vehicle 10 is stationary on grade 150, controller 88 could determine that a cargo load in pick-up bed 130, which is normally under a weight that would cause the GAWR threshold to be exceeded when vehicle 10 is relatively level, is enough to cause the GAWR threshold to be exceeded. In this scenario, controller 88 could cause GAWR warning device 18/110 to provide warning 100.

To account for this potential scenario where vehicle 10 is on a grade, such as grade 150, controller 88 can be configured to initially determine if vehicle 10 is on a grade with input from electronic stability control system accelerometer 140. If controller 88 determines vehicle 10 is on a grade, and determines that the load on at least one of the axles 26, 34 is above the GAWR threshold, controller 88 can be configured to determine the amount of resultant force $F_R$ that is contributing to the resultant load $N_R$ based on input from accelerometer 140. Controller 88 can then subtract this amount of contributing load from the determined resultant load $N_R$ estimated on axle 34 to determine a grade compensated load. Controller 88 can then compare such determined grade compensated load to the predetermined GAWR threshold to determined if such threshold has been exceeded before causing GAWR warning device 18/110 to provide warning 100.

What is claimed is:

1. A warning system for a vehicle having a front axle, a rear axle and an air suspension system, comprising:
   an indicator;
   an event data recorder; and
   a controller operatively associated with the air suspension system, the event data recorder and the indicator, the controller configured to:
   determine a load on the front axle and the rear axle when the vehicle is in a static condition;
   compare the determined load on the front and rear axles to a predetermined load threshold for each of the front and rear axles;
   provide a warning signal to the indicator indicative of at least one of the determined loads exceeding the corresponding predetermined load threshold upon the controller determining one of the determined loads exceeds the corresponding predetermined load threshold;
   lower a ride height of the vehicle when at least one of the determined loads exceeds the corresponding predetermined load threshold; and
   communicate data indicative of at least one of the determined loads exceeding the corresponding predetermined threshold to the event data recorder;
   wherein the indicator includes at least one of an audio visual system associated with an interior of the vehicle, a dedicated warning display system associated with the interior of the vehicle, and a warning system associated with an exterior of the vehicle.

2. The system of claim 1, wherein the predetermined thresholds are the gross axle vehicle weight ratings for the front and rear axles.

3. The system of claim 1, wherein the indicator includes a first indicator associated with an instrument panel of the vehicle and configured to issue a visible and audible warning, and a second indicator associated with an exterior of the vehicle adjacent a cargo bed of the vehicle and configured to issue a visible and audible warning.

4. The system of claim 1, wherein the controller is configured to determine the load on the front and rear axles a second time upon determining the vehicle has been in motion and is again in the static condition, or upon sensing that the pressure in at least one of the suspension struts has changed indicating a potential change in the load on the associated axle.

5. The system of claim 1, wherein the controller is configured to continuously communicate the data indicative of the at least one of the determined loads exceeding the predetermined threshold until the at least one determined load is determined to be below the corresponding predetermined threshold.

6. The system of claim 1, wherein the controller is configured to cooperate with the air suspension system to maintain a predetermined ride height of the vehicle when cargo is loaded onto the vehicle upon the controller determining that the vehicle with the loaded cargo is below the predetermined load thresholds for the front and rear axles.

7. The system of claim 1, wherein the controller is configured to lower the ride height of the vehicle proportional to an amount the vehicle with the loaded cargo exceeds the at least one of the predetermined load thresholds.

8. The system of claim 1, further comprising an electronic stability control system having at least a longitudinal accelerometer, the electronic stability control system operatively coupled to the controller, the controller in cooperation with the longitudinal accelerometer configured to determine an increased resultant force being exerted on one of the front and rear axles based on the vehicle being on a grade and account for this increased resultant force in determining if at least one of the determined loads exceeds the corresponding predetermined threshold.

9. The system of claim 8, wherein the controller is configured to determine if the front or rear axle is being subjected to the increased resultant force and account for this increased resultant force by subtracting an amount of the increased resultant force from the determined load on the axle being subjected to the increased resultant force.

10. A warning system for a vehicle including a front axle, a rear axle and an air suspension system, comprising:
    an indicator;
    an electronic stability control system including a longitudinal accelerometer;
    an event data recorder configured to record certain vehicle conditions and data associated therewith; and
    a controller operatively associated with the indicator, air suspension system, electronic stability control system and event data recorder, the controller configured to:
        determine a load on the front axle and the rear axle when the vehicle is in a static condition based on data from the air suspension system;
        determine if the vehicle is on a grade;
        determine a grade compensated load on the front axle and the rear axle when the vehicle is on a grade and is in a static condition;
        compare the determined load on the front and rear axles to a predetermined load threshold for each of the front and rear axles when the vehicle is not on a grade;
        compare the grade compensated load on the front and rear axles to the predetermined load threshold for each of the front and rear axles when the vehicle is on a grade;
        provide a warning signal to the indicator indicative of at least one of the determined loads or at least one of the grade compensated loads exceeding the corresponding predetermined load threshold upon the controller determining at least one of the determined loads or at least one of the grade compensated loads exceeds the corresponding predetermined load threshold; and
        communicate data indicative of at least one of the determined loads or at least one of the grade compensated loads exceeding the corresponding predetermined threshold to the event data recorder for a duration that the at least one of the determined loads or at least one of the grade compensated loads exceeds the corresponding predetermined threshold.

11. The system of claim 10, wherein the controller is configured to:
    determine if the front or rear axle is being subjected to the increased resultant force based on the vehicle being on the grade and account for this increased resultant force by subtracting an amount of the increased resultant force from the determined load on the axle being subjected to the increased resultant force to determine the grade compensated load.

12. The system of claim 10, wherein the indicator is configured to issue an audible and a visible warning based on the provided warning signal; and
    wherein the indicator includes a first indicator associated with an instrument panel of the vehicle and a second indicator associated with an exterior of the vehicle.

13. The system of claim 12, wherein the second indicator is incorporated into a center high mounted stop lamp of the vehicle.

14. The system of claim 10, wherein the controller is configured to cooperate with the air suspension system to maintain a predetermined ride height of the vehicle when cargo is loaded onto the vehicle upon the controller determining that the vehicle with the loaded cargo is below the predetermined load thresholds for the front and rear axles; and
    wherein the controller is configured to lower the ride height of the vehicle upon determining that the vehicle with the loaded cargo exceeds at least one of the predetermined thresholds for the front and rear axles.

15. The system of claim 14, wherein the controller is configured to lower the ride height of the vehicle proportional to an amount the vehicle with the loaded cargo exceeds the at least one of the predetermined load thresholds.

16. The system of claim 10, wherein the predetermined load thresholds are the gross axle weight ratings for the front and rear axles.

17. A warning system for a vehicle having a front axle, a rear axle and an air suspension system, comprising:
    an indicator;
    an event data recorder; and
    a controller operatively associated with the air suspension system, the event data recorder and the indicator, the controller configured to:
        determine a load on the front axle and the rear axle when the vehicle is in a static condition;
        compare the determined load on the front and rear axles to a predetermined load threshold for each of the front and rear axles;
        provide a warning signal to the indicator indicative of at least one of the determined loads exceeding the corresponding predetermined load threshold upon the controller determining one of the determined loads exceeds the corresponding predetermined load threshold;
        lower a ride height of the vehicle when at least one of the determined loads exceeds the corresponding predetermined load threshold; and
        communicate data indicative of at least one of the determined loads exceeding the corresponding predetermined threshold to the event data recorder;

wherein the indicator includes a first indicator associated with an instrument panel of the vehicle and configured to issue a visible and audible warning, and a second indicator associated with an exterior of the vehicle adjacent a cargo bed of the vehicle and configured to issue a visible and audible warning.

18. The system of claim 17, wherein the controller is configured to determine the load on the front and rear axles a second time upon determining the vehicle has been in motion and is again in the static condition, or upon sensing that the pressure in at least one of the suspension struts has changed indicating a potential change in the load on the associated axle.

19. A warning system for a vehicle having a front axle, a rear axle and an air suspension system, comprising:
   an indicator;
   an event data recorder; and
   a controller operatively associated with the air suspension system, the event data recorder and the indicator, the controller configured to:
      determine a load on the front axle and the rear axle when the vehicle is in a static condition;
      compare the determined load on the front and rear axles to a predetermined load threshold for each of the front and rear axles;
      provide a warning signal to the indicator indicative of at least one of the determined loads exceeding the corresponding predetermined load threshold upon the controller determining one of the determined loads exceeds the corresponding predetermined load threshold;
      lower a ride height of the vehicle when at least one of the determined loads exceeds the corresponding predetermined load threshold; and
      communicate data indicative of at least one of the determined loads exceeding the corresponding predetermined threshold to the event data recorder;
   further comprising an electronic stability control system having at least a longitudinal accelerometer, the electronic stability control system operatively coupled to the controller, the controller in cooperation with the longitudinal accelerometer configured to determine an increased resultant force being exerted on one of the front and rear axles based on the vehicle being on a grade and account for this increased resultant force in determining if at least one of the determined loads exceeds the corresponding predetermined threshold.

20. The system of claim 19, wherein the controller is configured to determine the load on the front and rear axles a second time upon determining the vehicle has been in motion and is again in the static condition, or upon sensing that the pressure in at least one of the suspension struts has changed indicating a potential change in the load on the associated axle.

* * * * *